United States Patent
Murrish

(10) Patent No.: US 10,521,700 B2
(45) Date of Patent: Dec. 31, 2019

(54) METHODS AND SYSTEMS FOR CONVERTING A LINE DRAWING TO A RENDERED IMAGE

(71) Applicant: HONDA MOTOR CO., LTD., Minato-ku, Tokyo (JP)

(72) Inventor: Robert Wesley Murrish, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 243 days.

(21) Appl. No.: 15/842,225

(22) Filed: Dec. 14, 2017

(65) Prior Publication Data

US 2019/0188534 A1 Jun. 20, 2019

(51) Int. Cl.
G06K 9/62 (2006.01)
G06N 3/08 (2006.01)
G06K 9/48 (2006.01)

(52) U.S. Cl.
CPC ............ *G06K 9/6262* (2013.01); *G06K 9/48* (2013.01); *G06N 3/08* (2013.01)

(58) Field of Classification Search
CPC ........... G06K 9/6262; G06K 9/48; G06N 3/08
See application file for complete search history.

(56) References Cited

U.S. PATENT DOCUMENTS

| | | | |
|---|---|---|---|
| 6,744,915 B1 | 6/2004 | Barton et al. | |
| 6,785,418 B1 | 8/2004 | Barton et al. | |
| 7,079,114 B1 | 7/2006 | Smith et al. | |
| 2009/0284550 A1 | 11/2009 | Shimada et al. | |
| 2011/0193869 A1 | 8/2011 | Perani et al. | |
| 2012/0086705 A1 | 4/2012 | Tsang | |
| 2013/0147800 A1 | 6/2013 | Ogata et al. | |
| 2014/0313216 A1 | 10/2014 | Steingrimsson | |
| 2014/0365993 A1 | 12/2014 | Rath et al. | |
| 2015/0338934 A1 | 11/2015 | Hawkins | |
| 2016/0016363 A1 | 1/2016 | Smith et al. | |
| 2016/0070986 A1 | 3/2016 | Chidlovskii et al. | |
| 2018/0150947 A1* | 5/2018 | Lu | G06N 3/0454 |
| 2019/0188831 A1* | 6/2019 | Chen | G06T 5/005 |

FOREIGN PATENT DOCUMENTS

| | | |
|---|---|---|
| CN | 104850633 A | 8/2015 |
| JP | 2013-161443 A | 8/2013 |
| JP | 2015-201151 A | 11/2015 |
| KR | 10-2009-0029447 A | 3/2009 |

OTHER PUBLICATIONS

Seddati, O., et al., "DeepSketch: Deep Convolutional Neural Networks for Sketch Recognition and Similarity Search," ResearchGate, Conference Paper, Jun. 2015.

Yu, Q., et al., Sketch-a-Net that Beats Humans, pp. 1-12, 2015.

* cited by examiner

*Primary Examiner* — Phuoc Tran
(74) *Attorney, Agent, or Firm* — Arent Fox LLP

(57) ABSTRACT

The system includes a memory that stores instructions for executing processes converting line drawings to rendered images. The system also includes a processor configured to execute the instructions. The instructions cause the processor to: train a neural network to account for irregularities in the line drawings by introducing noise data into training data of the neural network; receive a first line drawing from an input device; generate a first rendered image based on features identified in the first line drawing; and display the first rendered image on an output device.

20 Claims, 6 Drawing Sheets

METHODS AND SYSTEMS FOR CONVERTING A LINE DRAWING TO A RENDERED IMAGE

TECHNICAL FIELD

The present disclosure relates to methods and systems for converting a line drawing to a rendered image.

BACKGROUND

Image processing may include converting a line drawing to a corresponding rendered image. This conversion may be achieved using edge detection techniques, which may be used to find boundaries of objects by detecting discontinuities in brightness. In some instances, edge detection techniques may be for image segmentation and data extraction in areas such as image processing, computer vision, and machine vision. In some applications, the purpose of detecting the discontinuities in brightness may be to capture important events and changes in properties of the world. For example, discontinuities in brightness may be related to discontinuities in depth, discontinuities in surface orientation, changes in material properties, and/or variations in scene illumination. In some implementations, edge detection techniques treat edges of an object as an absolute truth, e.g., the rendered image is generated to look identical to the line drawing, thereby resulting in a rendered image having unwanted irregularities. However, these irregularities may be undesired in the rendered image. There is a need in the art, therefore, for methods and systems for converting a line drawing to a rendered image without undesired irregularities in the rendered image.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure is related to a system that includes a memory that stores instructions for executing processes for converting line drawings to rendered images. The system also includes a processor configured to execute the instructions. The instructions cause the processor to: train a neural network to account for irregularities in the line drawings by introducing noise data into training data of the neural network; receive a first line drawing from an input device; generate a first rendered image based on features identified in the first line drawing; and display the first rendered image on an output device.

In a further aspect, a method that includes training a neural network to account for irregularities in line drawings by introducing noise data into training data of the neural network. The method also includes receiving a first line drawing from an input device. The method further includes generating a first rendered image based on features identified in the first line drawing. The method also includes displaying the first rendered image on an output device.

In a further aspect, the present disclosure is related to a non-transitory computer-readable storage medium containing executable computer program code. The code comprises instructions configured to cause a processor to: train a neural network to account for irregularities in line drawings by introducing noise data into training data of the neural network; receive a first line drawing from an input device; generate the first rendered image based on features identified in the first line drawing; and display the first rendered image on an output device.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a teen and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

Figure 1:
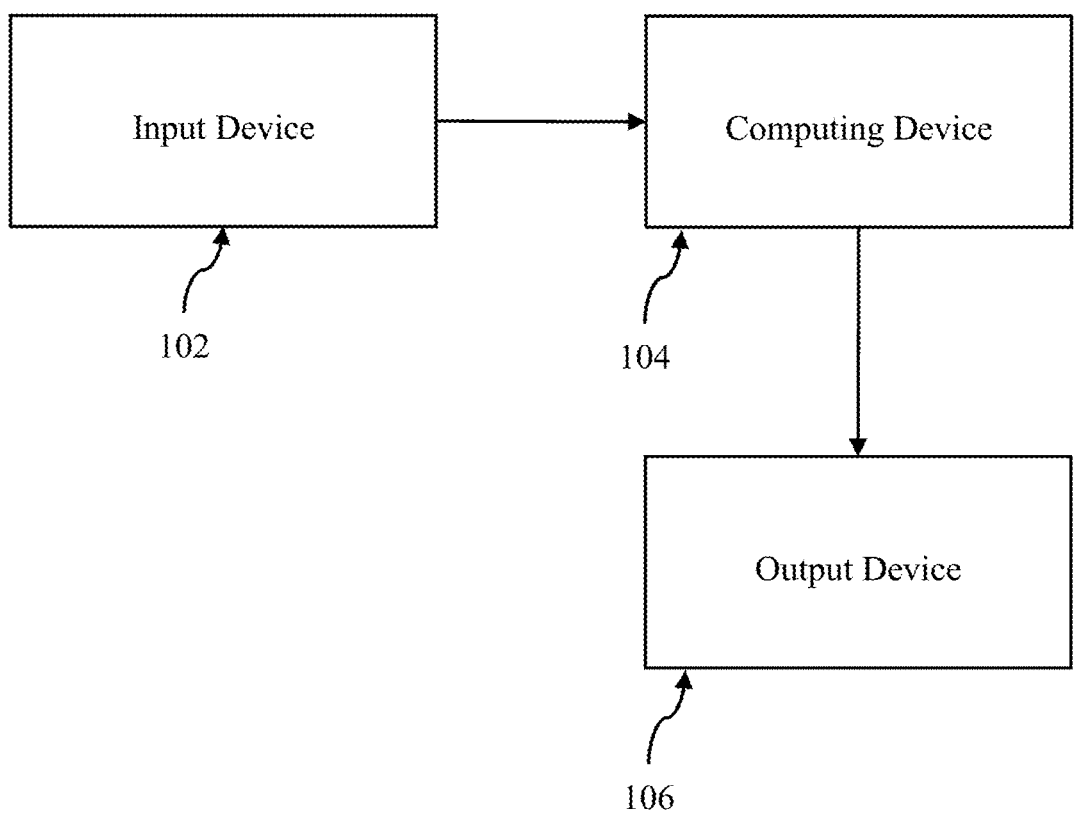
FIG. 1 illustrates an exemplary operating environment for converting a line drawing to a rendered image in accordance with aspects of the present disclosure.

Generally described, the present disclosure provides systems and methods for converting a line drawing to a rendered image. FIG. 1 illustrates an exemplary operating environment for converting a line drawing to a rendered image in accordance with aspects of the present disclosure. The operating environment includes an input device 102 for capturing the line drawing and a computing device 104 for converting the line drawing to a rendered image. In some aspects, the rendered image may be displayed on an output device 106.

Figure 2:
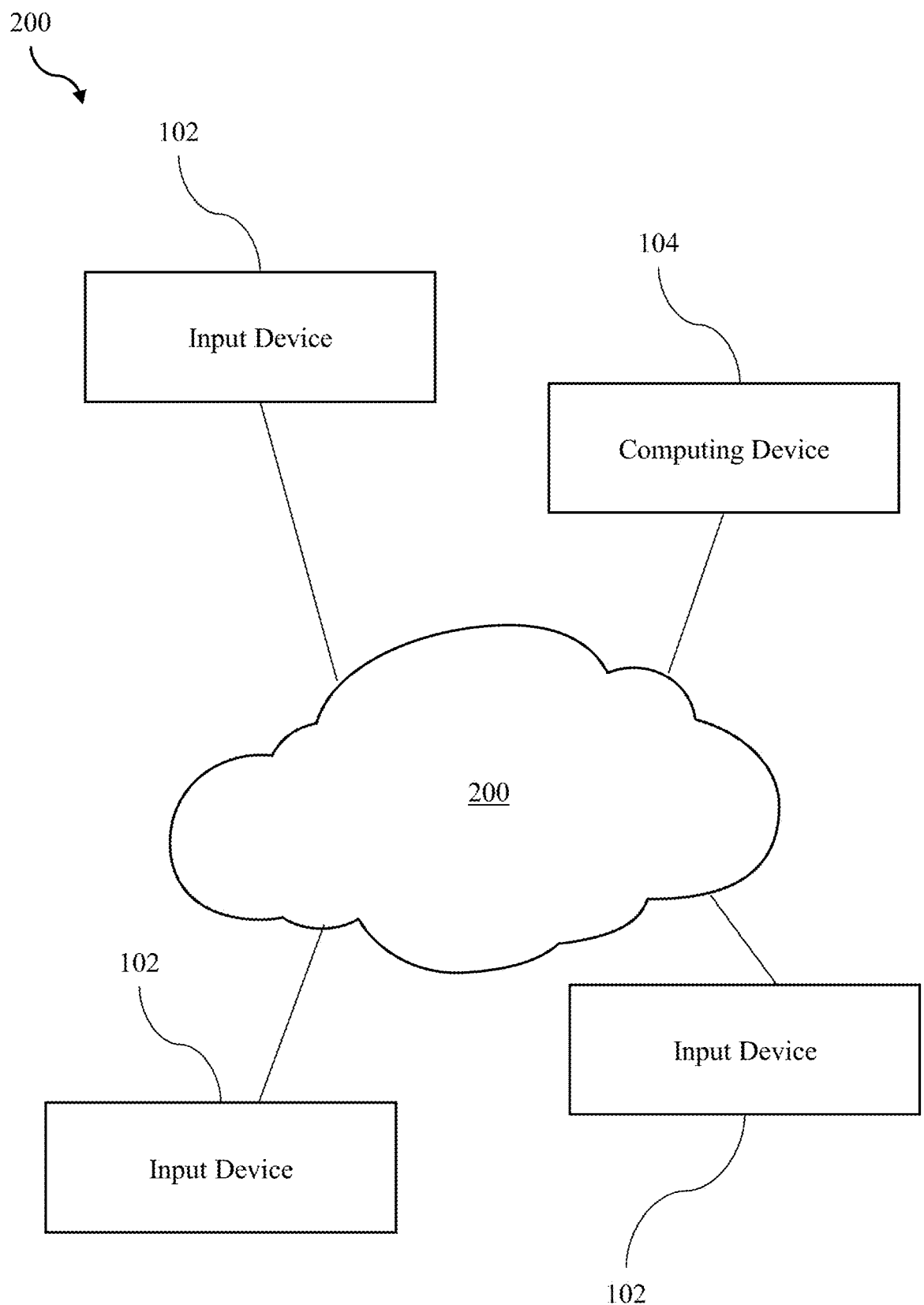
FIG. 2 illustrates an exemplary network for receiving inputs from input devices over a network, in accordance with aspects of the present disclosure.

In some aspects, the input device 102 may be, for example, an interactive whiteboard or notebook, for capturing a line drawing. In other aspects, the line drawing may be illustrated on a medium, e.g., paper, a whiteboard, etc., and the input device 102 may be an image capturing device, such as a camera, that captures an image of the line drawing. In some aspects, the line drawing may be hand-drawn image of, for example, a vehicle. In some aspects, the hand-drawn image may be transmitted to the computing device 104. For example, the hand-drawn image may be transmitted either through a local wire connection or via a wireless connection over a network, e.g., the network illustrated in FIG. 2, which illustrates an example network 200 for facilitating communications between the a plurality of input devices 102 and the computing device 104. For example, the network 200 may include the Internet or another internet protocol (IP) based network. The input devices 102 may communicate over the network 200 via a transceiver (not shown). The network 200 may couple the one or more input devices 102, to one or more computing devices 104 via, for example, wired, wireless, or fiberoptic links. In addition the network 200 may couple the one or more input devices 102 and the one or more display devices 104 to one or more display devices (not shown). The one or more computing devices 104 may refer to any computer system including smartphones, tablets, laptops, personal computers (PCs), minicomputers, mainframe computers, microcomputers, telephonic devices, or other wireless devices, such as personal digital assistants ("PDAs") or a hand-held wireless devices, among others.

Figure 3:
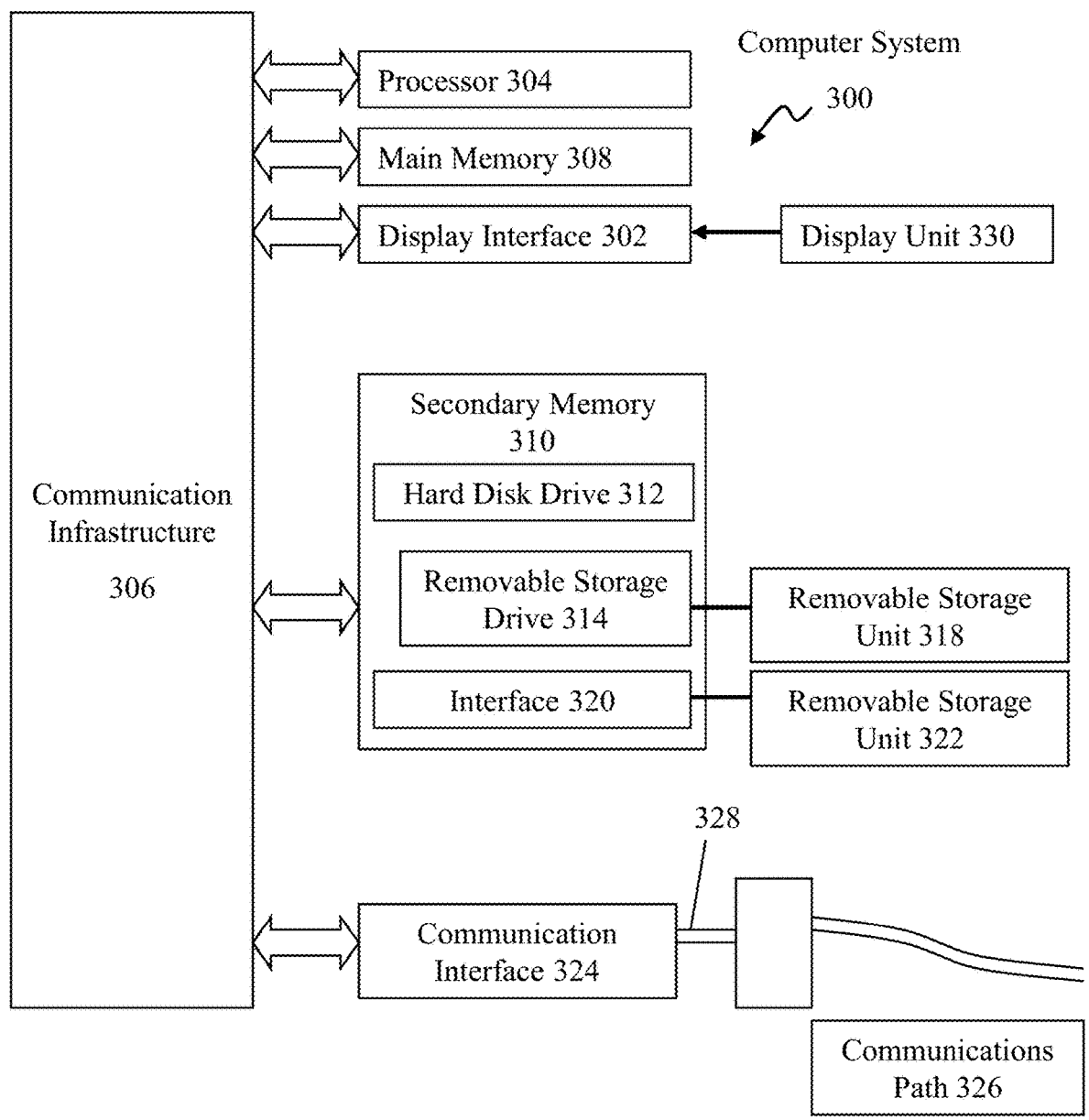
FIG. 3 illustrates various features of an exemplary computer system for use in conjunction with aspects of the present disclosure.

The one or more computing devices 104 may include a computer system 300, as shown with respect to FIG. 3 described below. The computer system 300 may also include a memory that stores instructions for executing processes for converting a line drawing to a rendered image and a processor configured to execute the instructions. The memory may be local to the computer system 300 or remote.

In some aspects, the computing device 104 may convert a line drawing to a rendered image using a neural network, such as a conditional. Generative Adversarial Network (cGAN). In some aspects, the cGAN may be configured to learn a conditional generative model that enables the cGAN to convert the line drawing to the rendered image, i.e., perform image-to-image translation tasks. In some aspects, the computing device 104 may use the line drawing as a guideline rather than an absolute truth, and the computing device 104 may generate the rendered image based on the guideline. To achieve this, in some aspects, the cGAN may be trained based on different types of noise to account for irregularities in the hand-drawn image. For example, the different types of noise may include different types of edge noise. In some aspects, this noise is added to account for irregularities in the hand-drawn image that may be caused by, for example, an unsteady hand. This noise may allow the cGAN to account for variations, e.g., waviness, in the lines, such that the cGAN does not exactly follow the lines and generates a more natural output as a result.

Figure 6:
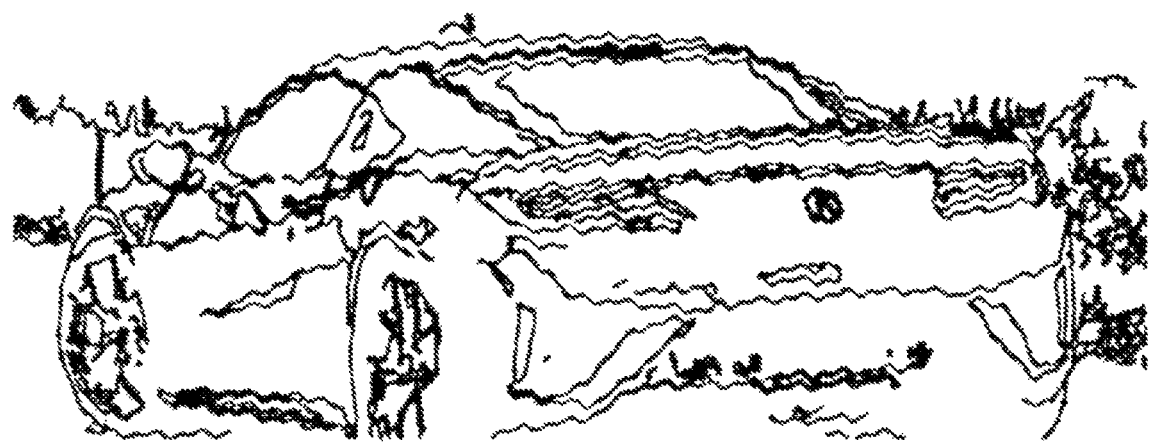
FIG. 6 illustrates exemplary training edge noise data, in accordance with aspects of the present disclosure.

In some aspects, the edge noise may be introduced as a high-frequency noise illustrative of a fine noise corresponding the individual lines of the hand-drawn image. In further aspects, the edge noise may be introduced as a low-frequency noise illustrative of course noise over the hand-drawn image. In still further aspects, the edge noise may be introduced as a repetitive noise illustrative of multiple striations of the same line. For example, as illustrated in FIG. 6, the edge noise may be introduced at high and low frequencies. By incorporating the different types of noise in the training data, the cGAN may learn that the hand-drawn image is a guideline to the desired result, rather than an absolute truth.

Additionally, in some aspects, the cGAN may also be trained using a database of images of a plurality of vehicles. For example, the database of images may include a plurality of images of a plurality of classes of vehicle. In some aspects, the plurality of images may be separated into a first set of training images and a second set of testing images. The classes of the vehicle may include a make, a model, and a year of the vehicle. In some aspects, the database of images of a plurality of vehicles may be stored on the memory shown with respect to the computing system 200. The cGAN may also be trained using a database of images of other types of objects, in accordance with aspects of the present disclosure.

Using this training data, the cGAN may learn different relationships between elements of a vehicle, such as spatial relationships between the different elements (e.g., the placement of a hood relative to a front bumper, a quarter panel, and a windshield), size relationships (e.g., the size of a tire and wheel relative to the size of a wheel well), color relationships (e.g., an expected color of a wheel and/or a tire), shape relationships (e.g., the expected shape of a wheel), etc. The cGAN may also learn other types of relationships, in accordance with aspects of the present disclosure. The computing device 104 may generate the rendered image based on these learned relationships. In further aspects, the computing device 104 may generate new features that were not previously introduced in the training data. For example, the computing device 104 may create a tire having a different color, e.g., charcoal, versus a conventional color, e.g., black.

In some aspects, the cGAN may include a generator and a discriminator. In some aspects, the generator and the discriminator may include a plurality of layers including a combination of one or more convolutional layers, one or more pooling layers, and/or one or more deconvolutional layers. In further aspects, the generator may be formed using an encoder-decoder architecture. In some aspects, the encoder-decoder architecture may be formed as an U-Net architecture. To achieve this, one or more skip connections may be provided between each layer i and layer n-i, where n is the total number of layers of the generator. For example, each skip connection may concatenate each channel at layer i with a corresponding channel at layer n-i, thereby changing the number of channels in the decoder.

In some aspects, each of the one or more convolution layers may be formed as 4×4 spatial filters with stride two (2). In further aspects, the one or more convolutional layers in the encoder and in the discriminator may down-sample an input by a factor of two (2), and the one or more convolutional layers in the decoder may up-sample the input by a factor of two (2). In some aspects, after a final layer in the decoder, a convolution may be applied to map to a number of output channels and a Tan h function may be applied to the number of output channels. In further aspects, after final layer in the discriminator, a convolution may be applied to map to a 1-dimensional output and a Sigmoid function may be applied to the 1-dimensional output.

In some aspects, upon receipt of a line drawing from the input device 102, the computing device 104 may convert the hand-drawn image to the rendered image using the hand-drawn image as a guideline. To generate the rendered image, the computing device 104 uses a shape of the image as a guideline, such that the computing device 104 ignores any irregularities of the hand-drawn image based on the training data, and rather uses the irregularities as a guideline to generate the rendered image. To achieve this, in some aspects, the computing device 104 may generate the rendered image using the learned relationships. For example, the computing device 104 may insert omitted elements or correct an irregular shape of an element using the learned relationships when generating the rendered image. In other aspects, the computing device may retrieve one or more images that match or resemble the outline based on the hand-drawn image. For example, the computing device 104 may retrieve a respective image for different elements for the outline and compile the respective images to form a composite rendered image. After generating the rendered image, the computing device 104 may be configured to output the rendered image to the display device 106.

Figure 4:
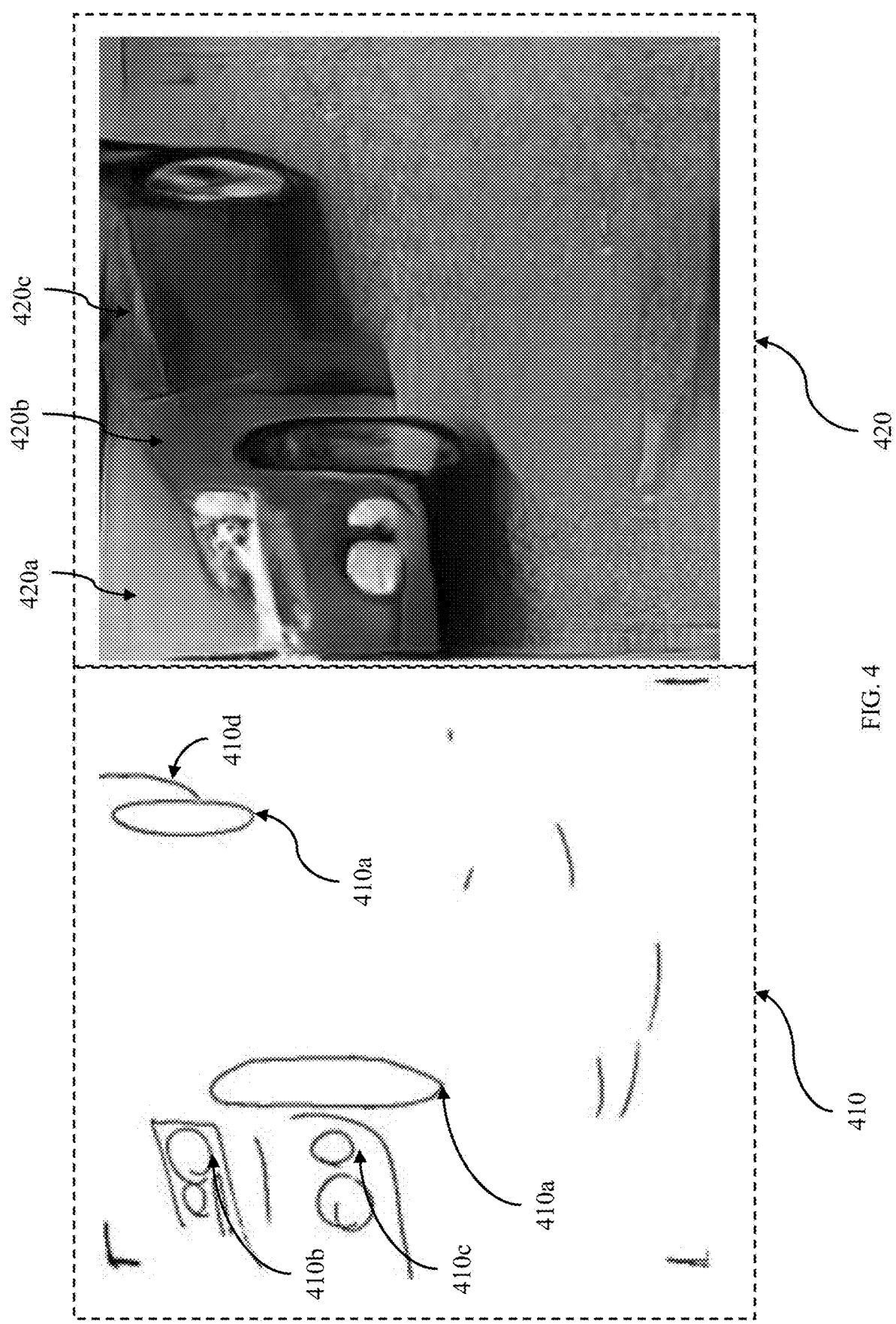
FIG. 4 illustrates an example conversion of a line drawing to a rendered image, in accordance with aspects of the present disclosure.

As an example, as illustrated in FIG. 4, the computing device 104 may receive the line drawing 410 and covert the line drawing 410 to the rendered image 420. The line drawing 410 is only a partial image of a vehicle having limited portions of the vehicle, including front/rear wheels 410a, a head light 410b, fog lights 410c, and a rear bumper 410d. In some aspects, the computing device 104 uses as this partial image 410 as an outline and retrieves respective image(s) for each of the front/rear wheels 410a, head light 410b, fog lights 410c, and rear bumper 4104. In addition, as the line drawing 410 is a partial image, the computing device 104 generates the rendered image 420 by filling in missing portions of the vehicle, e.g., a hood 420a, a quarter panel 420b, and a side door 420c, to complete the partial image. The computing device 104 may retrieve respective images for each of the elements and compile the respective images to generate the composite rendered image 420. Further, as illustrated in FIG. 4, the computing device 104 uses the shape of the fog light 410c as a guideline, i.e., the computing device 104 ignores the irregular line of the fog light 410c based on the training data, and rather uses irregular shape of the fog light 410c as a guideline to retrieve a circularly shaped image for the fog light 410c. Thus, the computing device 104 uses the training data introducing the different types of noise to ignore the irregularities in the line drawing 410 to generate the rendered image 420.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 5:
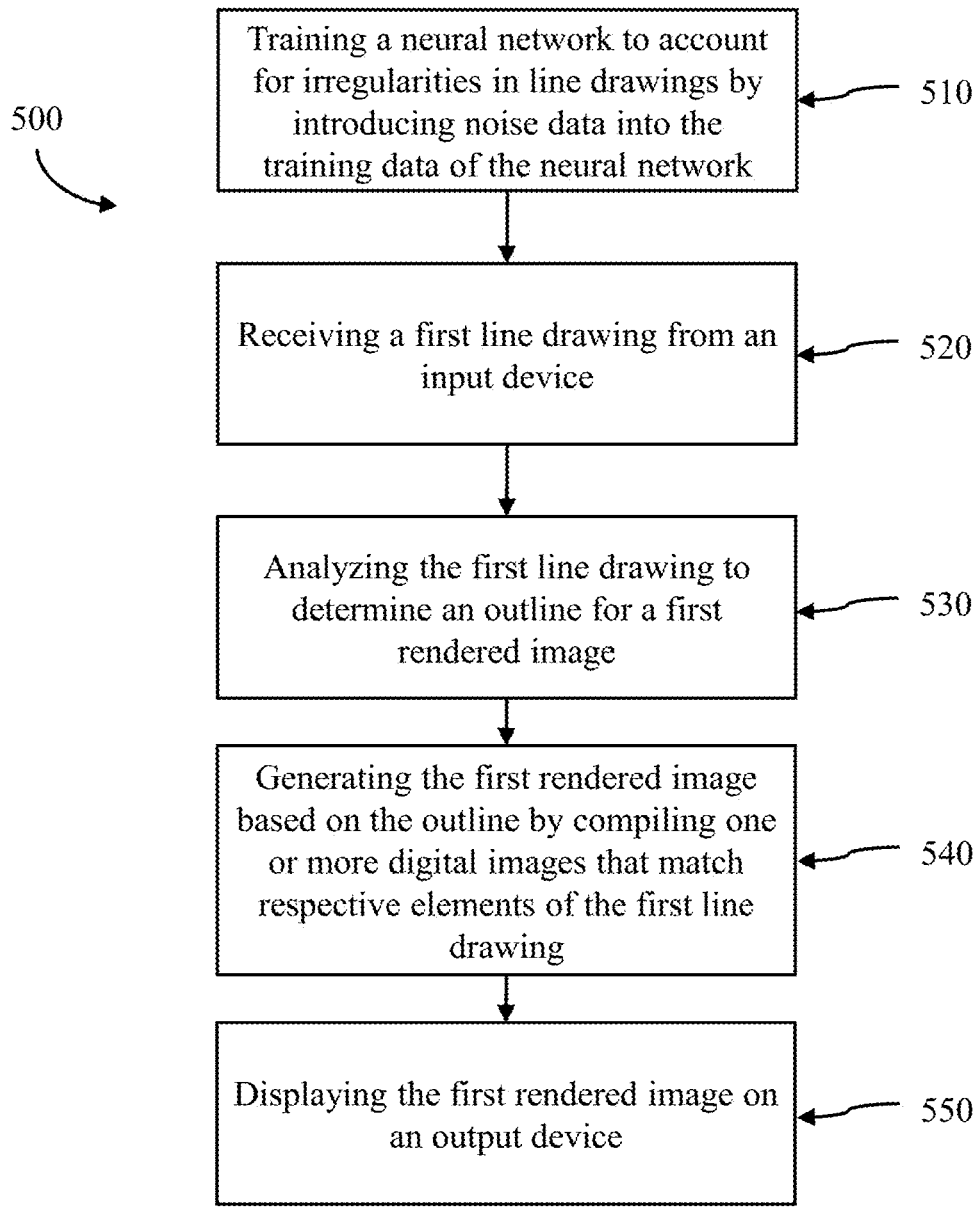
FIG. 5 illustrates a flowchart converting a line drawing to a rendered image.

FIG. 5 illustrates a flowchart converting a line drawing to a rendered image. A method 500 includes training a neural network to account for irregularities in line drawings by introducing noise data into training data of the neural network 510. The method also includes receiving a first line drawing from an input device 520 and analyzing the first line drawing to determine an outline for a first rendered image 530. The method further includes generating a first rendered image based on the outline by compiling one or more digital images that match respective elements of the first line drawing 540. The method also includes displaying the first rendered image on an output device 550.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system comprising:
a memory that stores instructions for executing processes for converting line drawings to rendered images; and
a processor configured to execute the instructions, wherein the instructions cause the processor to:
train a neural network to account for irregularities in the line drawings by introducing noise data into training data of the neural network;
receive a first line drawing from an input device;
generate a first rendered image based on features identified in the first line drawing; and
display the first rendered image on an output device.

2. The system of claim 1, wherein the neural network is a conditional Generative Adversarial Network (cGAN).

3. The system of claim 1, wherein the noise data comprises different types of edge noise.

4. The system of claim 3, wherein the different types of edge noise comprises high-frequency noise, low-frequency noise, and repetitive noise.

5. The system of claim 1, wherein the processor is further configured to train the neural network using a database of images, and wherein the first line drawing is a hand-drawn image.

6. The system of claim 5, wherein generating the first rendered image comprises compiling one or more digital images that match respective features identified in the first line drawing.

7. The system of claim 5, wherein the hand-drawn image is a partial image, and generating the rendered image comprises inserting omitted elements of the partial image based on relationships learned from the database of images.

8. A method comprising:
training a neural network to account for irregularities in line drawings by introducing noise data into training data of the neural network;
receiving a first line drawing from an input device;
generating a first rendered image based on features identified in the first line drawing; and
displaying the first rendered image on an output device.

9. The method of claim 8, wherein the neural network is a conditional Generative Adversarial Network (cGAN).

10. The method of claim 8, wherein the noise data comprises different types of edge noise.

11. The method of claim 10, wherein the different types of edge noise comprises high-frequency noise, low-frequency noise, and repetitive noise.

12. The method of claim 8, further comprising training the neural network using a database of images, and wherein the first line drawing is a hand-drawn image.

13. The method of claim 12, wherein generating the first rendered image comprises compiling one or more digital images that match respective features identified in the first line drawing.

14. The method of claim 12, wherein the hand-drawn image is a partial image, and generating the rendered image comprises inserting omitted elements of the partial image based on relationships learned from the database of images.

15. A non-transitory computer-readable storage medium containing executable computer program code, the code comprising instructions configured to cause a processor to:
train a neural network to account for irregularities in line drawings by introducing noise data into training data of the neural network;
receive a first line drawing from an input device;
generate a first rendered image based on features identified in the first line drawing; and
display the first rendered image on an output device.

16. The medium of claim 15, wherein the neural network is a conditional Generative Adversarial Network (cGAN).

17. The medium of claim 15, wherein the noise data comprises different types of edge noise including high-frequency noise, low-frequency noise, and repetitive noise.

18. The medium of claim 15, wherein the processor is further configured to train the neural network using a database of images, and wherein the first line drawing is a hand-drawn image.

19. The medium of claim 18, wherein generating the first rendered image comprises compiling one or more digital images that match respective features identified in the first line drawing.

20. The medium of claim 18, wherein the hand-drawn image is a partial image, and generating the rendered image comprises inserting omitted elements of the partial image based on relationships learned from the database of images.

* * * * *